United States Patent [19]

Williams et al.

[11] 4,185,696
[45] Jan. 29, 1980

[54] ROW CROP HARVESTER WITH ADJUSTABLE PICKING HEADS

[75] Inventors: Rodney B. Williams, Paso Robles; Jerry A. Taylor, Dixon, both of Calif.

[73] Assignee: Dixon "Y" Machine, Incorporated, Dixon, Calif.

[21] Appl. No.: 790,355

[22] Filed: Apr. 25, 1977

[51] Int. Cl.$^2$ .............................................. A01D 27/04
[52] U.S. Cl. ....................................... 171/38; 56/15.5; 56/119; 171/61; 171/62; 171/110; 171/47
[58] Field of Search .................... 171/1, 21, 44, 47, 61, 171/62, 82, 26–28, 37, 38, 40–42, 110, 139, 140, 141; 56/15.5, 98, 14.3, 119

[56] References Cited

U.S. PATENT DOCUMENTS

| | | | |
|---|---|---|---|
| 1,894,802 | 1/1933 | Urschel | 55/108 X |
| 2,522,308 | 9/1950 | Silva | 171/47 |
| 2,949,716 | 8/1960 | Thomson | 56/14.3 |
| 3,088,263 | 5/1963 | Thompson | 56/15.5 |
| 3,196,954 | 7/1965 | Hill et al. | 171/62 |
| 3,911,651 | 10/1975 | Schreiber | 56/98 |
| 3,968,842 | 7/1976 | Puch et al. | 171/61 |

*Primary Examiner*—Jay N. Eskovitz
*Attorney, Agent, or Firm*—A. J. Moore

[57] ABSTRACT

A row crop harvester is provided with mechanism for mounting two picking heads for both vertical and horizontal adjustment of the ground engaging lower ends of the heads, to simultaneously harvest two rows of plants which may vary in spacing from each other throughout their lengths. One head is guided along its row by steering the harvester itself, while the lower end of the other head is guided along its row by selectively operating controls which transversely shift the lower end of the head relative to the first mentioned steerable head thereby accurately following and simultaneously harvesting two rows of crops such as root crops.

In the preferred embodiment the upper end of each picking head is associated with a severing mechanism for removing the tops or foliage from the roots of the plants. The severing mechanisms are mounted at fixed locations on the vehicle and are associated with foliage separating devices for allowing the roots of the row crops received from each picking head to be collected by a transverse conveyor-elevator while the severed tops are deflected to the ground by vine guards and associated platforms.

10 Claims, 11 Drawing Figures

FIG_2

FIG_3

FIG_6

FIG_7

FIG_8

FIG-9

FIG_10

FIG_11

ROW CROP HARVESTER WITH ADJUSTABLE PICKING HEADS

CROSS REFERENCE TO RELATED APPLICATION

The present invention relates to a root crop harvester of the type which is disclosed in our pending Patent Application Ser. No. 693,461 filed on June 7, 1976, said application now being abandoned and refiled as Continuation application Ser. No. 877,441 on Feb. 13, 1978, which application covers the hydraulic drive system for the harvester.

BACKGROUND OF THE INVENTION

1. Field of the Invention

The present invention pertains to row crop harvesters and more particularly relates to root crop harvesters of the type employing multiple picking heads for simultaneously harvesting two planted rows.

2. Description of Prior Art

Single row root crop harvesters which include a plow for loosening the crop from the soil, a picking head including a pair of endless lifting conveyors for gripping the foliage and lifting the crop from the soil and thereafter delivering the crop to a severing mechanism, are well known in the art as evidenced by U.S. Urschel Pat. No. 2,562,400 which issued on July 31, 1951. The Urschel harvester is coupled to the draw bar of a tractor for movement through the field. In order to align the picking head with the single row being harvested, the entire harvester is moved laterally of the tractor by an operator seated on the harvester in position to manually move a lever which pivots a coupling device connecting the tractor to the harvester. The lever may also be pivoted in a vertical plane to raise or lower the resiliently supported front end of the picking head.

An earlier version of the Urschel single row harvester is disclosed in Urschel U.S. Pat. No. 1,894,802 which issued on Jan. 17, 1933. This patent discloses a self propelled beet harvester provided with a plow, a picking head, and two roller bar units for receiving the foliage of beets being harvested. The single picking head is mounted near its upper end for pivotal movement about horizontal and vertical axes. A hand lever and suitable linkage are provided for adjusting the height of the forward end of the picking head through a resilient connection which allows the forward end to follow the ground contour during harvesting. Foot pedals are provided for moving the forward end of the picking head transversely during harvesting. This patent, however, does not disclose a harvester having two picking heads with one head being transversely locked to the vehicle in a predetermined position so that simply steering the vehicle aligns that head with one of the rows being harvested, while the operator is free to independently shift the other head transversely relative to the first head to follow the other row being harvested.

Urschel U.S. Pat. No. 1,964,896 which issued on July 3, 1934 discloses a row crop harvester that is similar to Urschel U.S. Pat. No. 1,894,802 but is provided with roller bar units that are mounted on the upper end of the picking head for movement therewith.

Spiegl U.S. Pat. No. 2,368,895 which issued on Feb. 6, 1945 discloses a two row crop harvester having the upper ends of two picking heads pivotally mounted for movement about horizontal and vertical axes. The vertical position of the forward end of each picking head is maintained above the ground by a lever and suitable linkages. The transverse position of the forward end of the two picking heads are simultaneously adjusted by a crank and threaded rod that moves a V-shaped spreader longitudinally to spread or retract tongs connected to forward ends of the two heads. Although the above transverse adjustment may take place during harvesting, it will be recognized that it is much more inaccurate and difficult to coordinate the steering of the vehicle with the simultaneous lateral (and vertical) adjustment of both picking heads as required by Spiegl, than it is to center one head with one row by steering the vehicle and independently adjusting the other head transversely to follow another row as in the present invention.

U.S. reissue Pat. Re No. 20,151 which issued to Urschel on Oct. 27, 1936, discloses several forms of severing mechanisms of the roller topping bar type used in conjunction with harvesting row crops including cotton and corn as well as root crops.

U.S. Pat. No. 3,201,928 which issued to Claas on Aug. 24, 1965 discloses a multiple row corn harvester wherein the guide members for introducing stalks of corn to the picking heads may be laterally pre-adjusted for a particular row spacing, which spacing is stated to vary according to soil and weather conditions. Although the guide members are adjustable to the row spacing of the plants, no provision is present in the Claas apparatus which would permit adjustment during operation.

SUMMARY OF THE INVENTION

The row crop harvester of the present invention includes two picking heads which simultaneously harvest two rows of plants and transfer the plants to two associated overlapping crop severing mechanisms which sever the upper portion of the crop from the roots. A picking head mounting mechanism includes yokes for each head. Each yoke independently mounts the rear portion of the associated picking head for both substantially horizontal and substantially vertical pivotal movement. The mounting mechanism also includes a front end guide mechanism which supports the front end of each picking head for slidable movement along the ground in alignment with the row being harvested. The front end guide mechanism maintains the forward end of one of the heads (hereinafter termed the steered head) in fixed transverse position relative to the mobile harvester (after first being adjusted for the particular plant row spacing) and in alignment with the associated row being harvested by steering the harvester to follow the associated plant row. The front end guide mechanism also includes a portion that is connected to the front end of the other picking head (hereinafter referred to as the adjustable head) which may be readily adjusted transversely by the operator relative to the steerable head either before or during the harvesting operation. The operator therefore steers the vehicle to maintain the steered picking head centered on one row whether or not the row is straight, and selectively controls the adjustable portion of the front end guide mechanism to maintain the adjustable picking head in alignment with the other row whether or not that row is straight. Thus, the picking head mounting mechanism makes it possible to accurately follow two rows of plants being harvested even when the plants vary in elevation and also vary transversely from a straight line, and also when the spacing between the two rows of plants varies relative to each other or varies at different points throughout their lengths.

During harvesting, the forward inlet ends of the two picking heads are slidably guided along the ground and are free to independently pivot about their horizontal axes to compensate for variations in ground contour. The horizontal pivot axis of each picking head is positioned between the ends of the heads at a location closely adjacent to the inlet end of the associated crop severing mechanism and the outlet end of the two picking heads.

The two generally horizontal crop severing mechanisms overlap their associated picking heads to receive the crop from the two picking heads at transfer points and to thereafter sever the foliage from the roots. In the preferred embodiment, the driven severing mechanisms are secured in fixed position to the chassis of the harvester with the inlet ends thereof closely adjacent the horizontal pivot axis of the associated head. Also, in the preferred embodiment the generally horizontal axes of rotation of roller bar type severing mechanisms intersect a vertical plane containing the vertical pivot axis of the picking heads substantially at the points of transfer of the crops between each picking head and its associated severing mechanism. The location of the horizontal and vertical pivot axes relative to the picking heads thus permit pivotal movement of the picking heads in two planes without adversely affecting the transfer of the harvested crop from the picking heads into the associated severing mechanisms.

In the preferred embodiment of the row crop harvester, which harvester is illustrated as a root crop harvester, the roots when severed fall into a transfer conveyor-elevator for subsequent collection, while vine guards and cooperating cover plates deflect the foliage away from the transfer conveyor for discharge onto the ground.

It is therefore one object of the present invention to provide a two row harvester with two picking heads each of which may be controlled by an operator to accurately follow the plants in the rows even though the plants in each row are not accurately aligned with each other and even though the spacing between plants in the two rows varies at different points along the lengths of the rows.

Another object is to provide a row crop harvester having a pair of picking heads each mounted for pivotal movement about generally vertical and horizontal axes, which axes are positioned to effect reliable transfer of the crop from each picking head, when in any pivotal position, into its associated severing mechanism which is mounted in fixed position on the harvester chassis.

Another object is to provide means for collecting the crop while separately discharging the undesirable severed portion of the plant away from the collection area.

BRIEF DESCRIPTION OF THE DRAWINGS

FIG. 9 is a perspective illustrating the vine guards and cooperating platforms for laying the plant foliage over so that it will be discharged separately from the roots of the plants.

DESCRIPTION OF THE PREFERRED EMBODIMENT

The row crop harvester 10 (FIGS. 1 and 2) of the present invention is illustrated in its preferred form as a two-row root crop harvester for harvesting vegetables such as carrots, beets, turnips, parsnips, and rutabagas. It will be understood, however, that the unique picking head mounting mechanism 12, which constitutes an important feature of the invention and which is provided in order to accurately guide the two picking heads 14 and 16 along two rows of plants that vary in spacing from each other, can be used with other types of two-row harvesters such as corn or cotton harvesters.

In general, the harvester 10 preferably is a self propelled mobile vehicle 17 and comprises a chassis 18, mounted on two steerable front wheels 20,20a and two rear wheels 21,21a each of which is driven during the harvesting operation by a hydraulic motor 22 (FIG. 2) that receives hydraulic fluid from a pump 24 driven by an engine 26. The two front wheels 20,20a are steered by an operator by means of a steering wheel 28 at an operator's station 29 located between the picking head 14 and the left front wheel 20a. The hydrostatic drive for the wheels 20,20a, 21,21a is fully disclosed in our aforementioned copending application, the subject matter of which is incorporated by reference herein.

Figure 1:
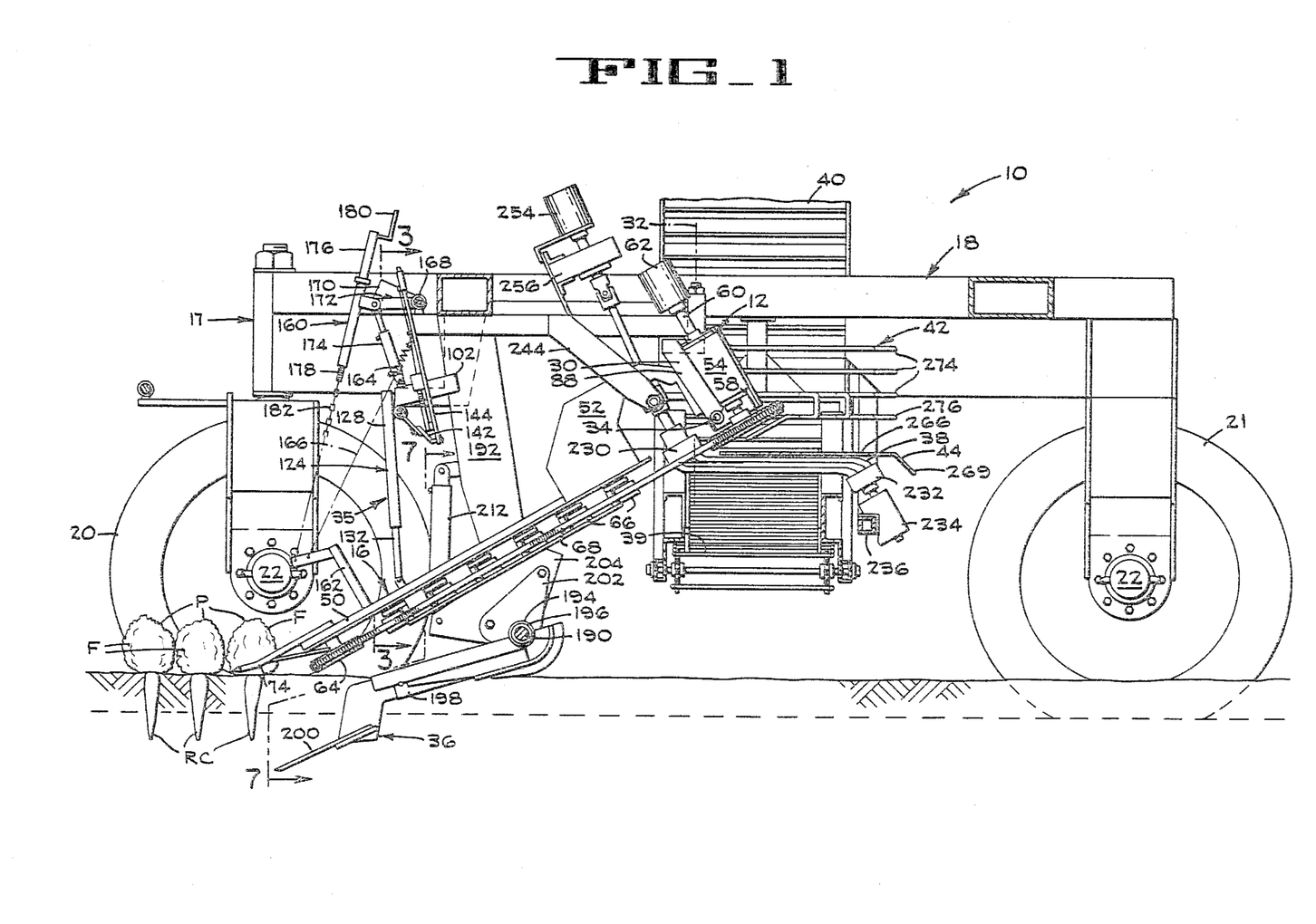
FIG. 1 is a diagrammatic longitudinal section taken substantially along lines 1—1 of FIG. 2 illustrating the row crop harvester of the present invention.

The harvester 10 includes the two substantially identical picking heads 14 and 16 each being pivotally mounted at its upper end to the chassis 18 by an associated yoke 30 of the mounting mechanism 12 for movement about a substantially vertical axis 32 and a substantially horizontal axis 34 (FIG. 1). The lower ends of the picking heads 14 and 16 are controlled by a front end guide mechanism 35 to maintain accurate alignment with the two rows R1 and R2 of plants P being harvested. If root crops, such as carrots are being harvested, plows 36,36a are inserted into the soil below the root crop RC in each row to loosen the roots from the soil permitting the picking heads 14 and 16 to grip the foliage F of the plants and lift the plants from the soil. The picking heads 14 and 16 advance the plants P upwardly and transfer them to associated severing mechanisms 38,38a which, as illustrated, are the well known roller topping bar type as fully disclosed in the aforementioned Urschel patents. The severing mechanisms transport the plants P above the lower end 39 of a driven transversely extending conveyor-elevator 40 of standard well known design. The roller topping bar severing mechanisms 38,38a sever the root from the foliage of each plant permitting the root RC to fall onto the conveyor-elevator 40 for conveyance out of the harvester and into a bulk bin truck or the like (not shown) that is driven alongside and parallel to the harvester during the harvesting operation.

The severed foliage is prevented from falling into the conveyor-elevator 40 by vine guards 42 and cooperating platforms 44 positioned over the lower portion 39 of the conveyor-elevator 40.

In order to distinguish between the two picking heads, the left picking head 14 (FIG. 2) will be termed the steerable picking head since the operator merely steers the harvester 10 in order to cause the picking head 14 to accurately follow the plants in the row R1 being harvested by the head 14. The other or right hand picking head 16 will be termed the adjustable picking head since its forward end is adjusted transversely relative to the steerable head 14 in order to align the adjustable head with the plants P in the second row R2 when the spacing between the two rows being harvested varies sufficiently to require such adjustment. Such adjustments may be made during, before, or after harvesting.

Although the specific details of the picking heads are conventional and not critical to the invention, one of the heads will be described for a better understanding of the operation of the harvester.

Since the details of each picking head are substantially the same, only the adjustable head 16 will be described in detail and equivalent parts of the head 14 will be assigned the same numerals followed by the letter "a".

Figure 4:
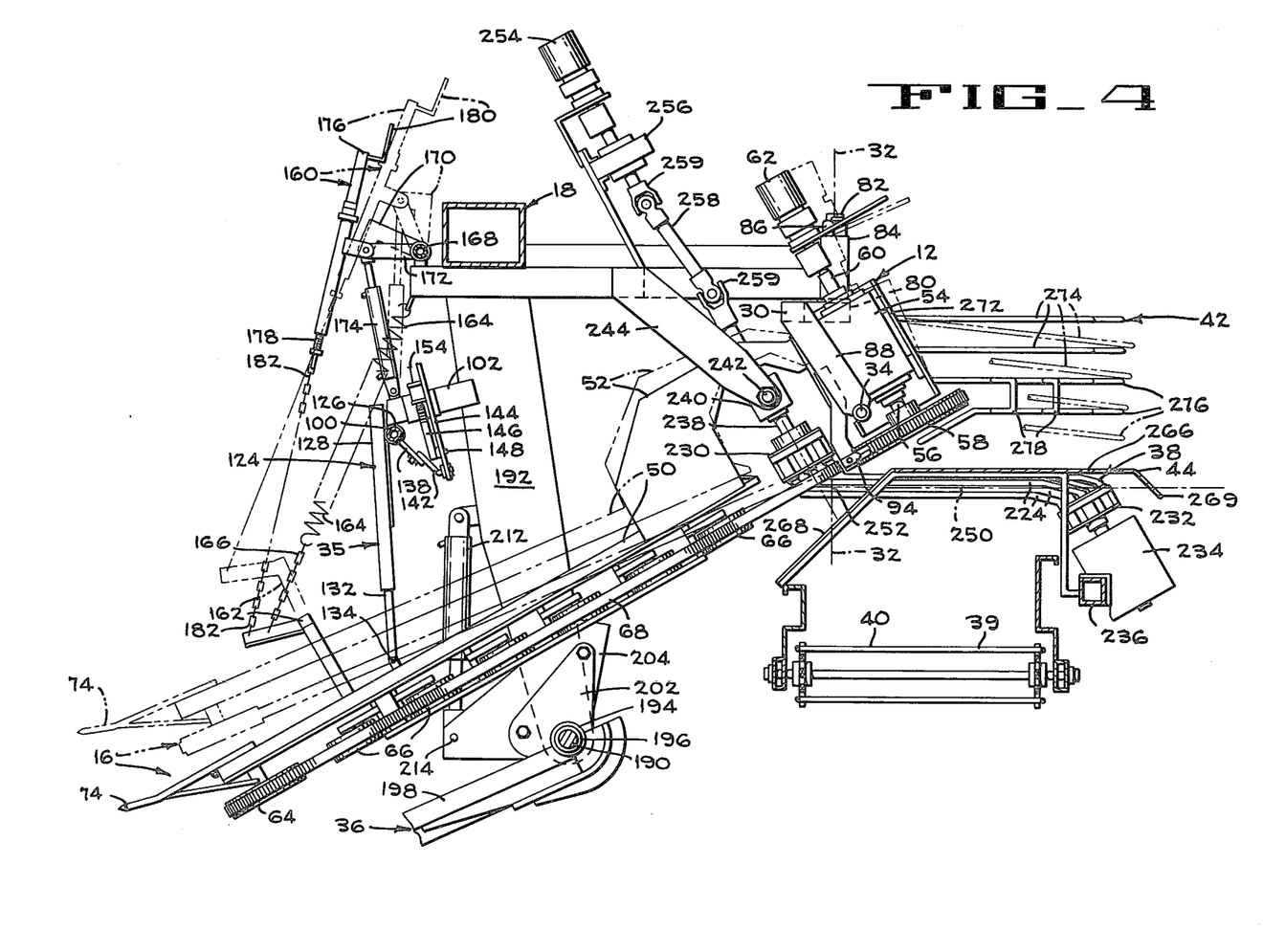
FIG. 4 is an enlarged longitudinal elevation of a portion of one of the picking heads and severing mechanisms with the picking head illustrated in solid lines in one operative position and in dotted lines in another operative position.
Figure 5:
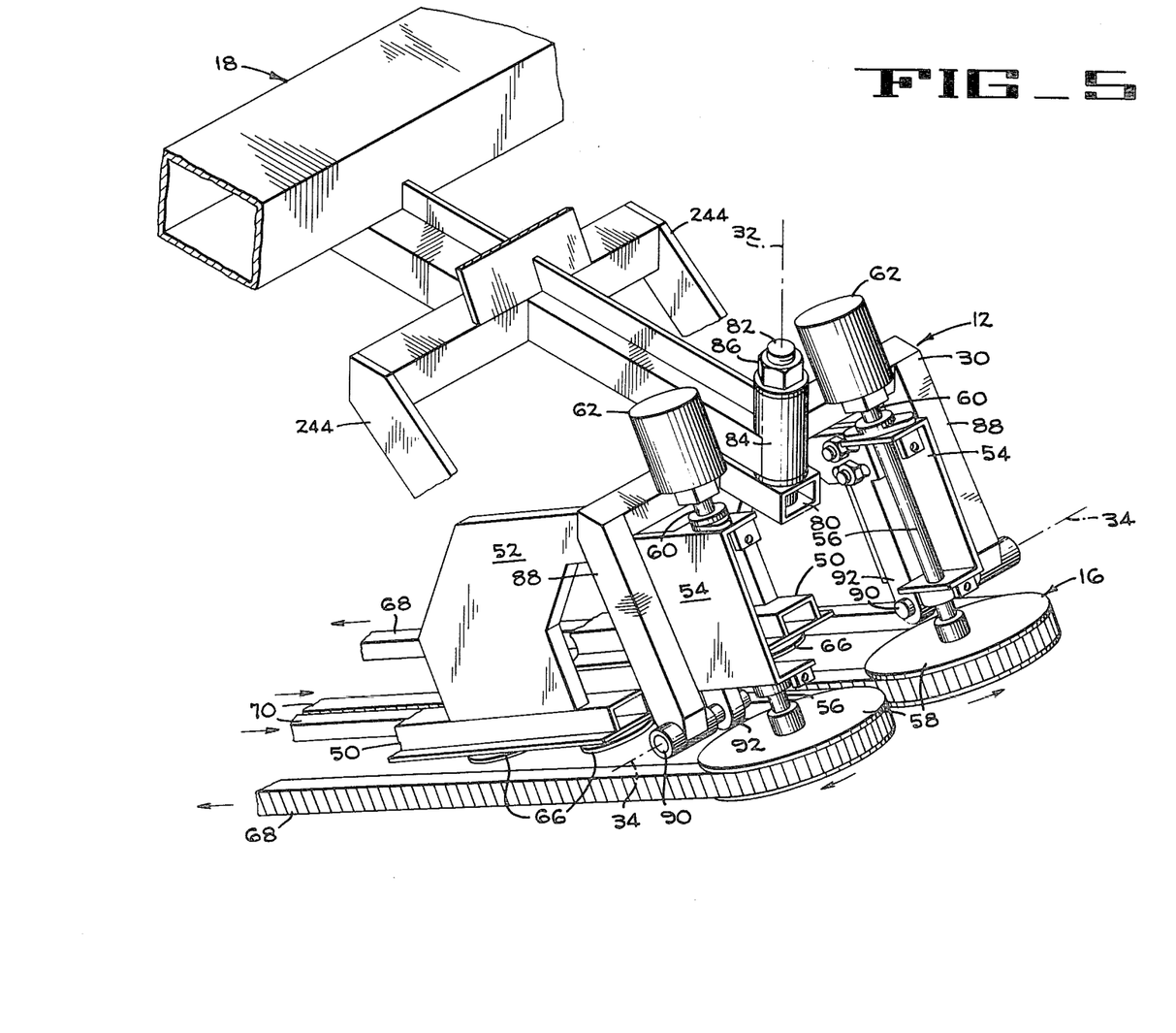
FIG. 5 is a perspective illustrating one of the yokes of a picking head mounting mechanism for mounting the rear end of one of the picking heads for pivotal movement about vertical and horizontal axes, the severing mechanism being omitted from this view.

Having reference to FIGS. 1, 4, and 5, the picking head 16 comprises a pair of spaced parallel box beams 50 each having an upstanding C-shaped mounting bracket 52 welded to its rear end. Each mounting bracket 52 has a channel shaped rear portion 54 (FIG. 5) secured thereto within which an elongated conveyor drive shaft 56 is journaled. A large diameter drive pulley 58 is secured to one end of the shaft 56 while the other end of the shaft is coupled to the driven shaft 60 of a hydraulic motor 62.

A large diameter idler pulley 64 (FIGS. 2 and 4) is journaled on the lower forward end of each box beam 50 and a series of small diameter pressure resisting idler pulleys 66 are rotatably supported on each beam 50 adjacent the longitudinal centerline of the picking head 16 and are resiliently urged toward the centerline. A foliage gripping endless lifter belt 68 having a grooved outer surface is trained around each group of drive, driven and idler pulleys with the inner runs 70 of the two lifter belts 68 being driven rearwardly and upwardly by the hydraulic motors 62.

The foliage gripping run 70 of the two endless lifter belts 68 are maintained in desired transverse relationship to each other by adjustably interconnecting the ends of the two box beams 50 by cross bolts or the like (not shown). A skid 74 is secured to the forward end of each box beam 50 and slides along the ground during harvesting in order to maintain the forward or pickup end of the picking heads 16 at the proper elevation regardless of variations in ground contour.

An important feature of the present invention is the structure for and manner of mounting both picking heads 14 and 16 to the chassis 18 of the harvester 10 so that the two heads may be accurately guided along and simultaneously aligned with the two rows of plants being harvested. The previously mentioned picking head mounting mechanism 12 includes the substantially identical yokes 30 for each picking head 14 and 16, and also includes the previously mentioned front end guide mechanism 35 for controlling the movement of the front end of both picking heads 14 and 16.

Since the upper end of both picking heads are mounted to the chassis 18 in the same way by associated yokes 30, only the yoke and mounting structure associated with the adjustable picking head 16 will be described in detail.

As best shown in FIG. 5, the yoke 30 is an inverted U-shaped structure with a centrally disposed box beam 80 projecting rearwardly therefrom. A vertical pivot shaft 82 is secured to the beam 80 and is journaled in a sleeve 84 rigid with the chassis 18 for pivotal movement about vertical axis 32. A nut 86 is screwed on the upper end of the shaft 82 to prevent axial movement of the shaft 82. The yoke 30 also includes two downwardly projecting legs 88 which are apertured to receive horizontal pivot pins 90 concentric with horizontal pivot axis 34. The pivot pins 90 are journaled in the forward legs 92 of the previously mentioned C-shaped brackets 52 of the picking head 16 thus permitting vertical swinging movement of the head 16 about horizontal axis 34. As shown in FIG. 4, dirt scrapers 94 may be mounted on the legs 92 to scrape dirt and debris from the grooves in the drive pulleys 58. Similar scrapers (not shown) are associated with the pulleys 64 and 66 to prevent build up of debris in the pulley grooves.

Figure 3:
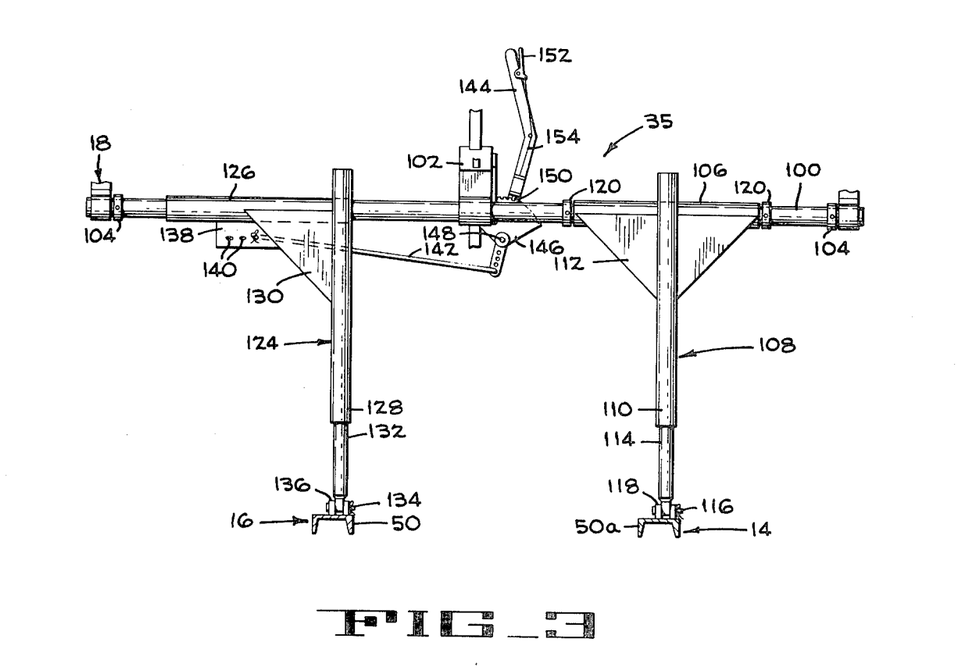
FIG. 3 is a transverse section taken substantially along lines 3—3 of FIG. 1 illustrating the front end guiding mechanism of the picking head mounting mechanism, certain parts of the picking heads being omitted.

The front end guide mechanism 35 (FIGS. 3 and 4) is provided to control the transverse position of the adjustable picking head 16 relative to the steerable picking head 14, and also to control horizontal pivotal movement of both heads 14 and 16.

The front end guide mechanism 35 comprises a cross shaft 100 secured to the harvester chassis 18 at its ends and at its central portion by a central chassis bracket 102. The shaft 100 is held from axial movement by lock collars 104 and slidably receives a horizontal tube 106 (FIG. 3) of a steerable head guiding bracket 108. The guide bracket 108 includes an upright tube 110 welded to the horizontal tube 106 and stiffened by a gusset plate 112 secured to both tubes. A rod 114 is slidably received in the upright tube 110 and has its lower end pivotally connected to one of the box beams 50a of the steerable picking head 14 by a pivot pin 116 and yoke 118. After the desired position of the forward end of the steerable picking head 14 has been determined for the particular average spacing of the rows in the field being harvested, a pair of lock collars 120 are secured to the cross shaft 100 in abutting engagement with the ends of the horizontal tube 106. This desired position may be determined by driving the harvester onto the field with its left wheels 20a and 21a centered in the valley V (FIG. 10) or V' (FIG. 11) between the second and third two-row vegetable beds B1-B8 (FIG. 10) nearest the edge of the field at which harvesting is to begin. The operator then pivots the front end of the steerable picking head 14 into alignment with row R1 and locks the collars 120 (FIG. 3) in abutting engagement with the ends of the horizontal tube 106 prior to commencing the harvesting operation.

A second guide bracket 124 (FIGS. 3 and 4) is provided for controlling the position of the forward end of the adjustable picking head 16. The bracket 124 comprises a horizontal tube 126 slidably received for lateral shifting movement on the cross shaft 100 and welded to an upright tube 128 with a gusset plate 130 welded to both tubes to stiffen the same. A rod 132 is slidably received within the upright tube 128 and is pivotally connected to one of the beams 50 of the adjustable picking head 16 by a pin 134 and yoke 136. A flange 138 having a plurality of spaced holes 140 therein is welded to the horizontal tube and receives one end of an actuating rod 142. The other end of the actuating rod 142 is connected to a lever 144 pivoted to a toothed quadrant 146 by a pin 148. The toothed quadrant 146 is secured to the chassis 18 and receives a spring loaded pin 150 selectively latched between the proper teeth by an operator manipulated handle 152 and linkage system 154. Thus, prior to beginning the harvesting operation, as well as during harvesting, the operator visually observes the relationship between the row R2 and the forward end of the adjustable picking head 16, and then moves the forward end of the head into alignment with row R2 by first gripping the handle 152 to release the pin 150 from the toothed quadrant 146 and then moving the lever toward or away from himself until the forward end of the adjustable picking head 16 is properly aligned with the row R2. The handle 152 is then released to latch the head 16 in selected position and from transverse movement relative to the steerable picking head 14.

It will be appreciated that the two guide brackets 108 and 124, when selectively positioned at the desired row spacing, will prevent transverse movement of the forward ends of the heads relative to the chassis 18 until the operator again adjusts one or both of the guide brackets 108,124. It will also be appreciated tha the pivotal mounting of the guide brackets 108 and 124 on the cross shaft 100, and the telescoped relationship of the rods 114 and 132 with the upright tubes 110 and 128, respectively, permits free swinging movement of the picking heads 14 and 16 about their horizontal axes 34a and 34 (FIG. 2), respectively. Thus, the forward ends of the picking heads 14 and 16 which slide along the ground during harvesting are free to follow the varying contour of the two rows being harvested.

As best shown in FIG. 4, a height controlling device 160 of the front end guide mechanism 135 is provided to control the vertical position of the forward ends of the picking heads 14 and 16. Although only the portion of the height controlling device 160 that is associated with the head 16 is illustrated in FIG. 4, it will be understood that equivalent structure is provided for picking head 14.

The device 160 includes a bracket 162 attached to one of the box beams 50 of the adjustable picking head 16. The bracket 162 is connected to the chassis 18 by a spring 64 and a chain 166 to thereby compensate for some of the weight of the forwad end of the head 16 and thus control the weight applied to the skids 74.

In order to control the lowermost position of the forward end of the picking head 16 and also to lift the forward end from the ground when making turns at the end of the field, or when traveling from field to field, the height control device 160 includes a cross shaft 168 pivotally mounted on the chassis 18. An angle bracket 170 is welded to the shaft 168 near its center, and two arms 172 (only one being shown) are welded to the shaft 168 near the ends thereof. A hydraulic cylinder 174 is pivotally connected between the angle bracket 170 and the aforementioned central chassis bracket 102. A crank operated adjusting device 176 is pivotally connected to one of the arms 172 and includes a threaded rod 178 which may be adjusted longitudinally of the device 176 upon rotation of the crank 180. A chain 182 connects the rod 178 to the bracket 162 of the picking head 16. Thus, when the hydraulic cylinder 174 is fully retracted, the crank 180 may be used to adjust the lowermost position to which the forward end of the head 16 may be lowered. The chain 182 will, of course, be slack during normal harvesting operation because the skids 74 supports the forward end of the picking head 16 at this time. When it is desired to transport the harvester from place to place or to turn the harvester after two rows have been harvested, the hydraulic cylinder 174 is extended under control of the operator thereby tightening the chain 182 and lifting the forward end of the picking head 16 above the ground. An adjusting device (not shown) that is similar to the device 176 is provided for the steerable head 14.

Figure 7:
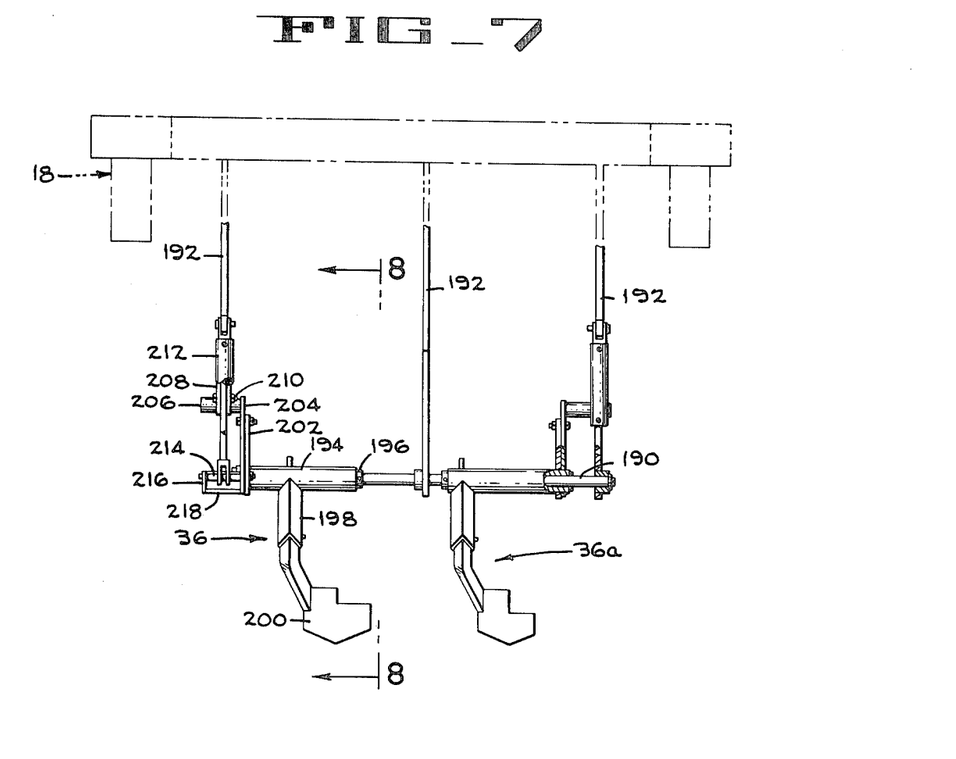
FIG. 7 is a transverse section taken along lines 7—7 of FIG. 1 illustrating the plow that is associated with the adjustable picking head, said head being omitted and certain parts of the plows being cut away.

The plows 36 and 36a (FIGS. 1, 7 and 8) for the picking head 16 and 14, respectively, are substantially the same in design and thus the description of the plow 36 associated with the adjustable head 16 will suffice for both plows.

The plow 36 is mounted on a transversely extending shaft 190 that is secured to three downwardly projecting legs 192 of the chassis 18. The plow 36 comprises a tube 194 journaled on the shaft 190 and is held in desired axial position by lock collars 196 which abut opposite ends of the tube 194. A shank 198 is secured to the tube 194 at a position along one side of the row being harvested and supports a sharpened blade 200 which is offset from the shank so that it will be disposed below the row during harvesting. An arm 202 rigid with the tube 194 is bolted to a depth adjuster 204 having an elongated stop bar 206 secured thereto and projecting transversely thereof. The stop bar 206 is of sufficient length to engage a wedge block 208 in any position within the range of transverse adjustment of the plow 36. The wedge block 208 is of channel construction and is secured to the adjacent chassis leg 192 by a slot and cap screw connection 210. As is apparent from FIG. 8, adjustment of the wedge block 208 along the associated chassis leg 192 will determine the depth of cut of the plow 36.

Figure 8:
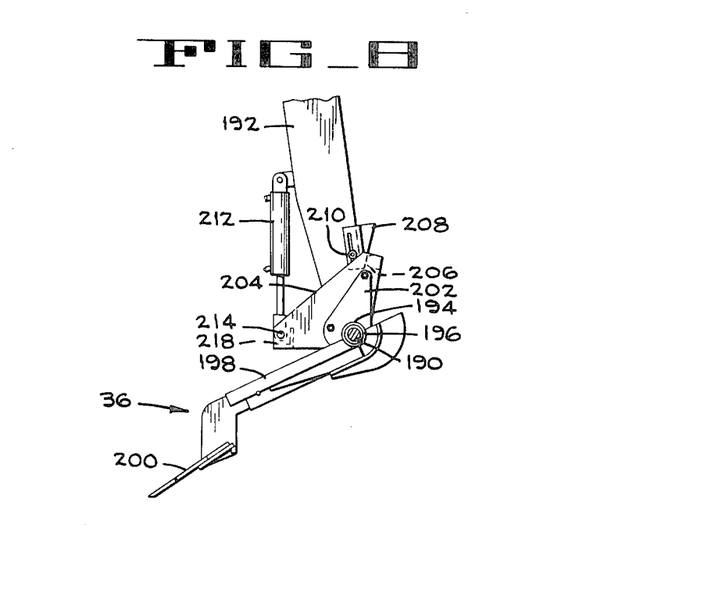
FIG. 8 is a section taken along lines 8—8 of FIG. 7.

A hydraulic cylinder 212 is pivotally connected at its upper end to the associated chassis leg 192 and at its lower end to an elongated capscrew 214. The capscrew 214 is threaded into the depth adjuster plate 204 and has its outer end supported by an end plate 216 of an angle bar 218 welded to the depth adjuster plate 204. Thus, the lower end of the hydraulic cylinder 212 is free to slide along the capscrew 214 when the plow 36 is being adjusted transversely of the harvester.

As mentioned previously, the plants being harvested are lifted by the lifter belts 68a and 68 of the two picking heads 14 and 16, and are transferred to the associated severing mechanisms 38a and 38. Both severing mechanisms are the same and are of the conventional roller topping bar type disclosed in the aforementioned Urschel patents. Thus, only the severing mechanism 38 associated with the adjustable picking head 16 will be described in sufficient detail to understand the operation of the same.

Figure 6:
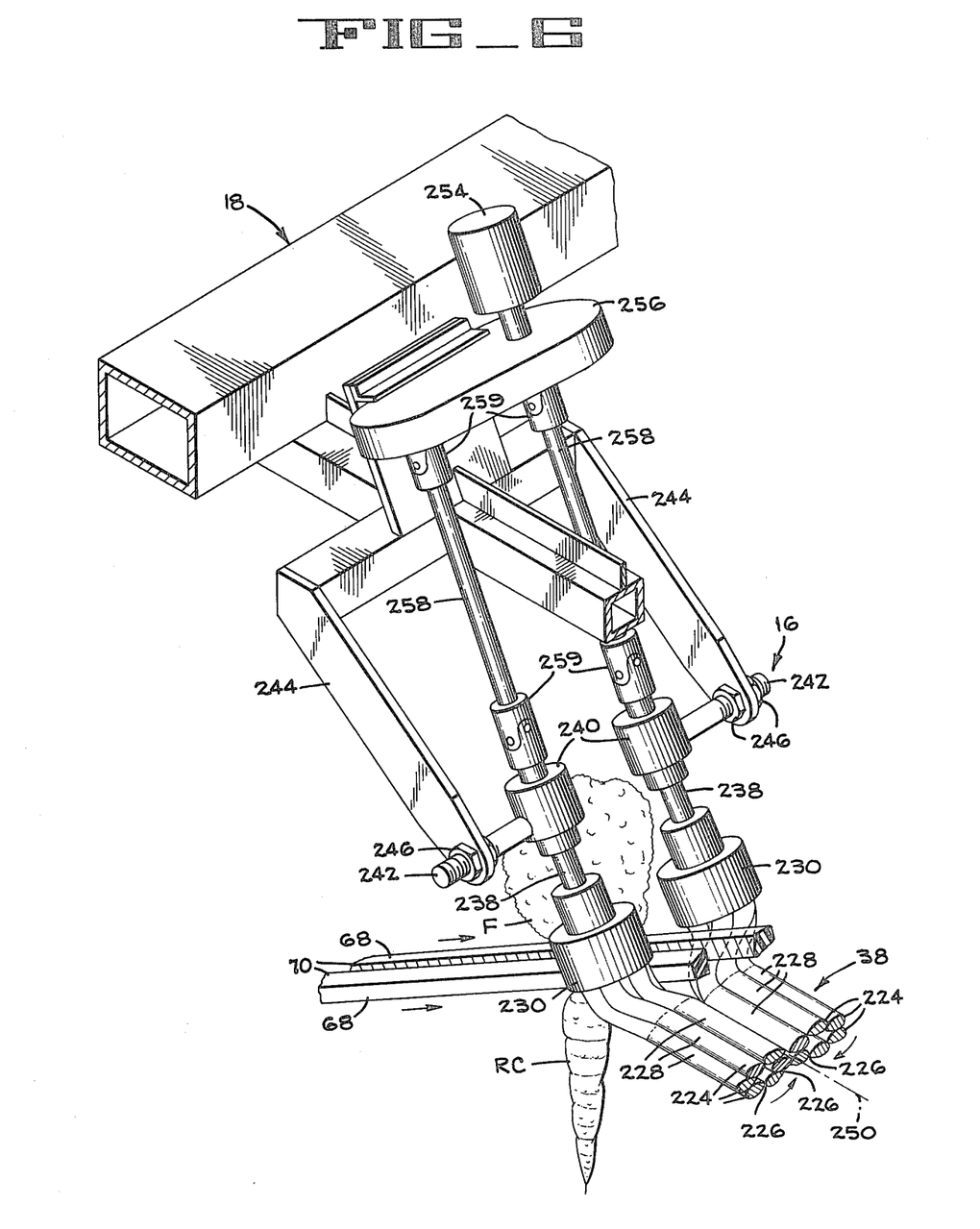
FIG. 6 is a perspective similar to FIG. 5 but illustrating the structure for mounting and driving one end of the roller topping bar type severing mechanism, the picking head mounting mechanism being omitted.

As best shown in FIGS. 4 and 6, the severing mechanism 38 comprises two series of overlapping bars 224 having their facing edges 226 sharpened sufficiently to sever the tops or foliage F from the roots RC of the plants being harvested. As illustrated in FIG. 4, the bars 224 each include a horizontal central portion 228 and two end portions angled in opposite directions and journaled in a drive bearing block 230 and a driven bearing block 232, which bearing blocks have parallel axes of rotation. As fully described in the Urschel reissue patent Re 20,151, rotation of the drive blocks 230 of both sets of bars 224 at the same speed but in opposite directions will cause the horizontal central portions 228 of the bars to remain horizontal and will cause the sharpened edges to remain facing each other as indicated in FIG. 6. When the bars 224 are driven in the direction indicated by the arrows in FIG. 6, the plants will be moved upwardly and to the right (FIGS. 4 and 6) until the large upper end of the roots RC engage the bars and prevents further upward movement. The bars 224 are adjusted so that the overlap gradually increases as the plants progress to the right (FIGS. 4 and 6) and such progression continues until the tops of the plants are severed or snapped from the roots.

The driven bearing blocks 232 (FIGS. 2 and 4) are each secured to shafts 233 which are journaled in bearing blocks 234 secured in properly adjusted position to a cross beam 236 of the chassis. The drive bearing blocks 230 are secured to shafts 238 (FIGS. 4 and 6) journaled in bearing blocks 240 which are welded to threaded support rods 242. The rods are supported by downwardly projecting legs 244 of the chassis 18 and are held in desired position by locknuts 246 threaded on the rods 242.

Thus, the severing mechanism 38 is mounted in fixed position on the chassis 18 and is adjusted so that the central portions 228 of the bars 224 are horizontal with the overlap of the two groups of bars gradually increasing toward the discharge end of the severing mechanism 38.

The mechanism 38 is also positioned so that a horizontal axis 250 (FIG. 4) between the two groups of bars 224 at the point of maximum overlap is horizontal and substantially intersects the vertical pivot axis 32 of the associated picking head 16. The point of intersection of these two axes will be referred to as the point of transfer 252 of the plants from the picking head 16 to the severing mechanism 38.

The two groups of bars 224 of the severing mechanism 38 are driven in the direction indicated in FIG. 6 by a hydraulic motor 254 which drives gears of equal diameter in a gear box 256 in opposite directions. The gears are connected to the shafts 238 by telescoping shaft 258 and universal joints 259. Standard well known operator controls (not shown) are provided to enable the operator to drive the severing mechanism 38 (and also the mechanism 38a) in the direction indicated in FIG. 6, during normal operation, and also in a reverse direction in the event rocks or debris get wedged between the two groups of bars 224 to thereby clear the debris from the bars.

As mentioned previously, the roots RC that are separate from the foliage F fall into the conveyor-elevator 40 (FIGS. 1, 4 and 9). In order to prevent the foliage F from also falling into the conveyor-elevator 40 and thus requiring sorting to remove the foliage from the crop, vine guards 42 and platforms 44 are provided to deflect the foliage away from the conveyor-elevator 40.

The platforms 44 are disposed over the conveyor-elevator 40 and comprise three plates 266, having downwardly inclined forward portions 268 and downwardly inclined rear portions 269. The plates 266 are separated from each other by slots 270 (FIG. 9) which permit the roots RC to hang downwardly from their foliage below the plates 266. The plates are supported on the chassis 18 by brackets 271 as shown in FIG. 9.

The vine guard 42 associated with the picking head 16 comprises a pair of pulley guards 272 (FIG. 9) secured to the associated rear portion 54 of the mounting bracket 52 of the picking head 16. Thus, the vine guards 42 pivot with their associated picking heads. Each pulley guard 272 has three converging, curved bars 274 welded thereto at their input ends with the bars being vertically aligned and curved inwardly over the associated slot 270 in the platforms 44 toward the longitudinal centerline of the harvester. Fourth bars 276 in each vine guard 42 have their forward ends disposed below the driven pulleys 58 and are supported from the lowermost bar 274 by rods 278. Thus, the severed foliage F is deflected away from the slots 270 by incoming plant foliage and is discharged onto the ground near the longitudinal centerline of the harvester 10.

Figure 2:
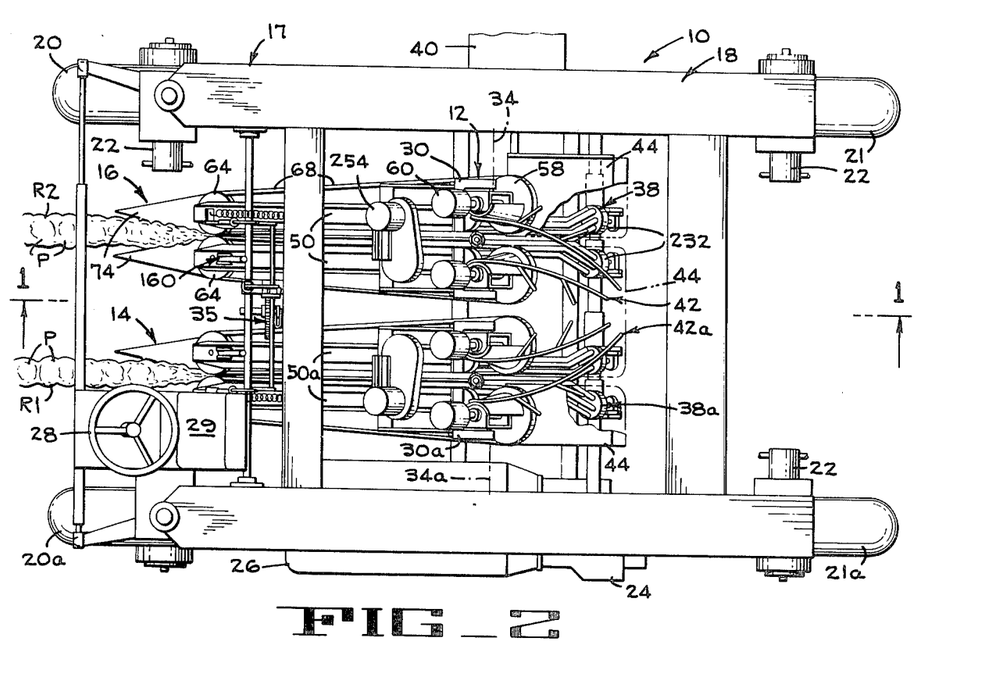
FIG. 2 is a diagrammatic plan of the harvester of FIG. 1.

The vine guard for the picking head 14 is substantially the same as that described above except it is curved in the opposite direction, i.e., toward the centerline of the harvester as illustrated in FIG. 2.

Although the operation of the row crop harvester 10 of the present invention has been covered during the description of the several components of the harvester, a brief summary of the operation will now be described.

Figure 10:
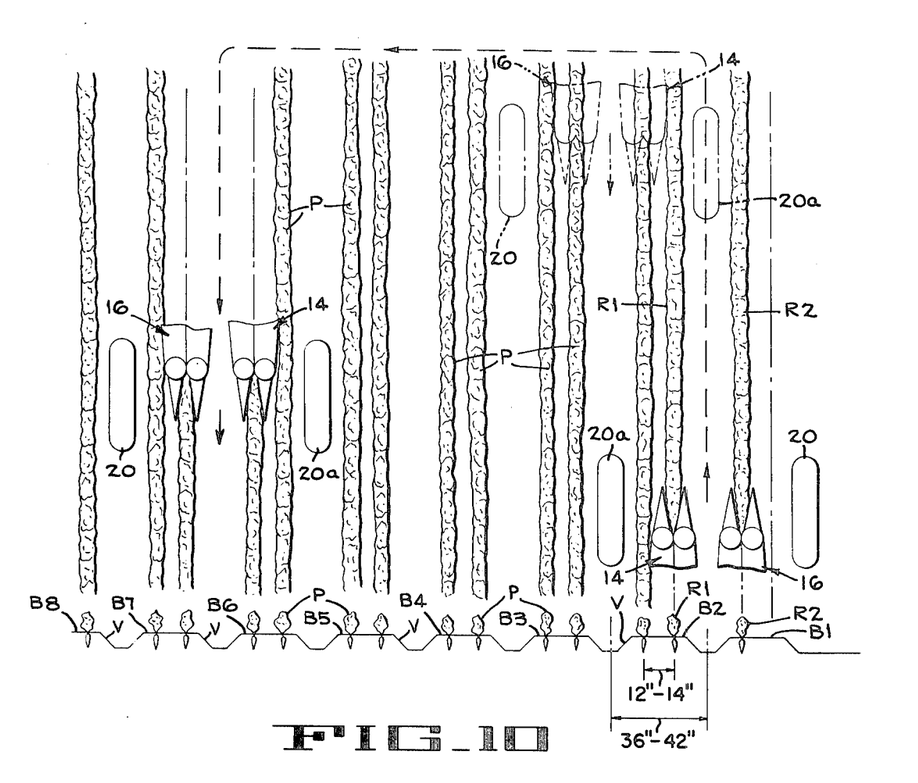
FIG. 10 is a diagrammatic operational view illustrating the preferred sequence of harvesting rows of plants in typical two-row vegetable beds, typical bed spacing and row spacing being given.
Figure 11:
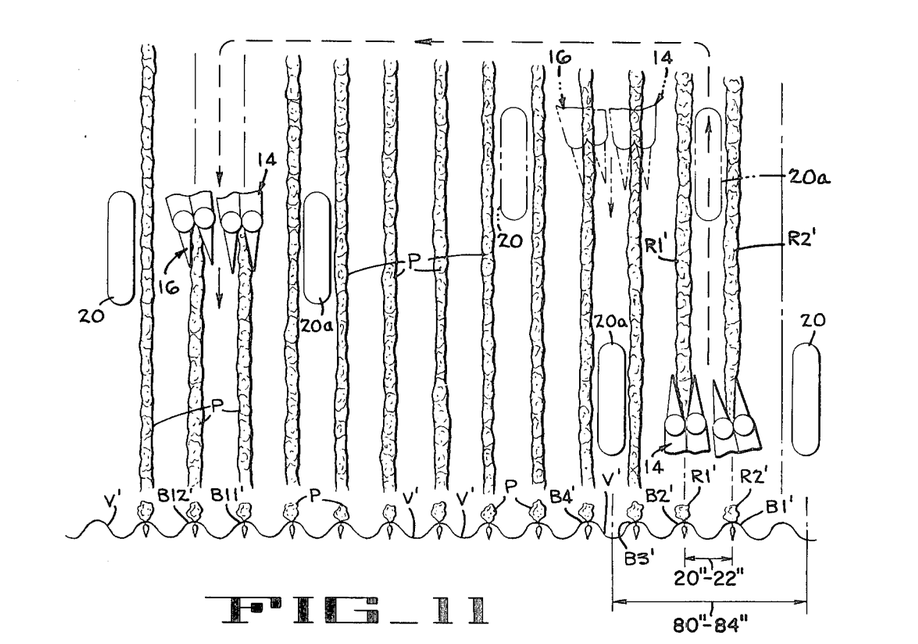
FIG. 11 is a diagrammatic operational view illustrating the harvester operating in typical single row bed plantings.
Figure 16:
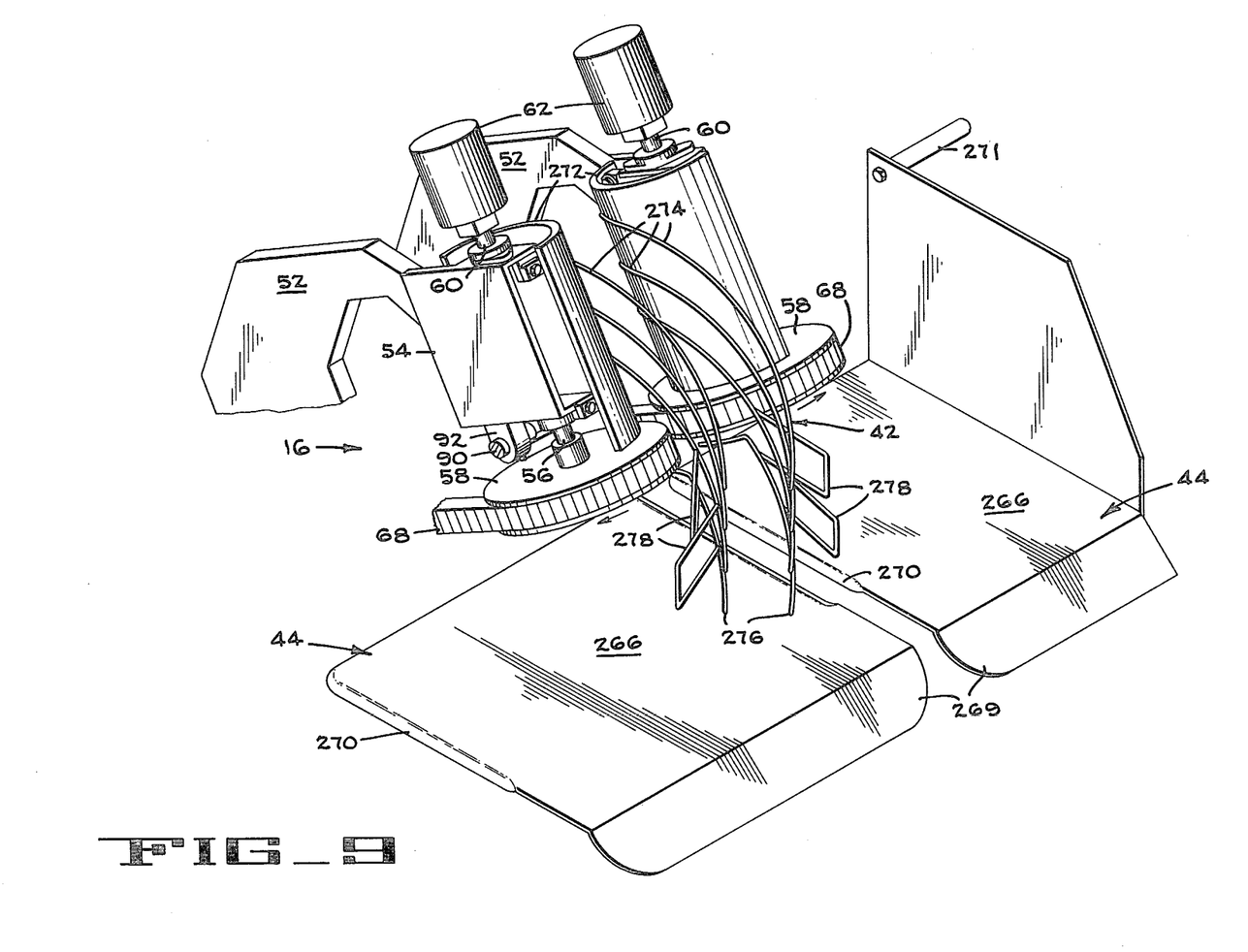

With the forward ends of the picking heads 14 and 16 (FIG. 1) raised by means of the hydraulic cylinder 174, and the plows 36,36a raised by the hydraulic cylinder 212, the operator drives the vehicle 17 to the field to be harvested, which field may be a typical two-row vegetable bed type as illustrated in FIG. 10 or a single row vegetable bed type as illustrated in FIG. 11. If the forward end of the picking heads 14 and 16 have not already been set for the particular row spacing in the field, the operator first adjusted the forward end of the steerable head 14 so that it will be centered relative to the row of plants nearest to the centerline of the vehicle and on the left side thereof when the left wheel 20a,21a are positioned to ride in the valley (FIG. 10) or V' (FIG. 11) between rows of plants. This adjustment is accomplished by shifting the guide bracket 108 (FIG. 3) and thereafter tightening the lock collars 120 on the shaft 100. The forward end of the adjustable picking head 16 is then adjusted until centered on the row R2 (FIG. 10) or R2' (FIG. 11) of plants on the right of and next to the centerline of the vehicle. The operator makes this adjustment prior to or during harvesting by pivoting the lever 144 as required thus moving the bracket 124 and forward end of the picking head 16 transversely of the harvester 10.

The operator then lowers the plow 36 (FIG. 1) and front ends of the picking heads 14 and 16 by means of the hydraulic cylinders 212 and 174, respectively. The skids 74 rest on and follow the contour of the ground during harvesting. However, if too much of the root is exposed above the ground level in certain areas along the row, the operator may actuate the hydraulic cylinder 174 to raise the forward ends of the picking heads 14 and 16 a short distance to engage the foliage but prevent the wide roots from becoming wedged between the runs 70 (FIG. 5) of the associated lifting conveyors 68.

Prior to commencing operation, the hydraulic motors 62 of all the lifting conveyors 68, and the hydraulic motors 254 to the two severing mechanisms 38 are started to drive these components. During harvesting, the lifting conveyors 68 grip the foliage F of the plants 10 and raise them from the soil that has been loosened by the plows 36, 36a leaving substantially all dirt and debris on the ground. When the plants arrive at the transfer points 252, the plants are transferred to the associated severing mechanism 38,38a and continue to move upwardly until the large upper ends of the roots RC prevent further upward movement. The severing mechanisms then sever the foliage F from the roots RC allowing the roots to drop into the conveyor-elevator 40 for momentary collection and subsequent discharge from the harvester 10 into a bulk bin truck or the like (not shown). The vine guard 42 and platforms 44 then deflect the foliage onto the ground near the centerline of the harvester.

When harvesting two-row vegetable beds B1–B8 of the type illustrated in FIG. 10, the operator positions the harvester 10 so that it straddles the first two beds B1 and B2 and adjust the picking heads as above described to harvest the innermost rows in the two beds while driving the harvester in one direction. After completing the first two rows R1 and R2, the operator turns the vehicle at the ends of the rows and may harvest the next two rows as indicated in dotted lines in FIG. 10, i.e., the second row in the second bed B2 and the next adjacent row in the third bed B3 while driving across the field in the opposite direction.

Although FIG. 10 indicates in dotted lines that the harvester 10 has been turned very sharply at each end of the rows to progress across the field in one bed increments for each turn, it will be appreciated that in normal operation much shallower turns are made at the ends of the fields. For example, the harvester may straddle the first two beds B1 and B2 when moving up the field and the operator may decide to skip three beds and return in the opposite direction when straddling the sixth and seventh beds B6 and B7 as indicated by the dotted line path thus avoiding the necessity of reversing the harvester to make sharp turns at the ends of the field. The wide turns and three bed spacing is retained until the field is harvested, and the skipped rows may be harvested later, or at the beginning of the operation by making several dry runs when moving up the field but harvesting only the four return runs.

When harvesting single row bed plantings as indicated in FIG. 11, the harvester straddles two beds B1' and B2' when going up the field and another two beds B3' and B4' when moving in the opposite direction down the field. As indicated above, several pairs of rows may be skipped after the first turn so that the harvester need not be sharply turned and may return down beds B11' and B12' as indicated.

From the foregoing description it is apparent that the row crop harvester of the present invention includes two picking heads each of which is capable of being accurately guided along its associated row during harvesting even though the rows are not straight and the spacing between rows varies throughout their lengths. The harvester also includes driven severing mechanisms associated with each pivoted picking head, which severing mechanisms are located in fixed position on the vehicle but reliably receive the plants at the transfer points when the picking heads are pivoted to any of their picking positions. Vine guards and cooperating platforms are provided on the harvester for separately discharging the roots and foliage of the harvested plants.

Although the best mode contemplated for carrying out the present invention has been herein shown and described, it will be apparent that modification and variation may be made without departing from what is regarded to be the subject matter of the invention.

What we claim is:

1. In a row crop harvester for simultaneously harvesting two rows of plants; the combination of a steerable mobile vehicle having a chassis, a pair of picking heads supported by said chassis, means for independently mounting one end of each picking head on the chassis for pivotal movement about vertical and horizontal axes, means for locking the other end of one of said heads in preselected transverse position relative to the vehicle depending upon the spacing of the rows in the field being harvested for maintaining alignment of said one head with one of said rows by steering the vehicle while allowing said one head to pivot about said horizontal axis during harvesting, and adjustment means connected between the chassis and the other head for selectively laterally shifting the other end of the other head transversely along a fixed path relative to said one head and to the chassis during harvesting for maintaining alignment of said other head with the second row when the spacing between the rows varies, said adjustment means being operator controlled during harvesting.

2. An apparatus according to claim 1 and additionally comprising ground engaging means for supporting the other end of each head on the ground for following the contour of the ground causing the two heads to independently pivot about said horizontal axes.

3. An apparatus according to claim 1 wherein said adjustment means comprises a guide bracket pivotally mounted on said chassis for said lateral shifting movement relative to said vehicle, an upright tube included in said bracket, a rod slidably received in said tube and pivotally connected to said other picking head for permitting vertical pivotal movement of said other head but precluding transverse movement thereof relative to said guide bracket, and operator controlled means for activating said adjustment means for moving said guide bracket transversely of said vehicle.

4. An apparatus according to claim 3 wherein said operator controlled means comprises a manually operated lever pivoted to said chassis and a linkage interconnecting said lever to said guide bracket.

5. An apparatus according to claim 1 and additionally comprising plant gripping means in each picking head for gripping the plants in the associated rows and for advancing the gripped plants to a transfer point, and severing means supported by said chassis for receiving the plants at said transfer point from each picking head and severing each plant into two pieces.

6. An apparatus according to claim 3 and additionally comprising plant gripping means in each picking head for gripping the plants in the associated rows and for advancing the gripped plants to the transfer point, and severing means supported by said chassis for receiving the plants at said transfer point from each picking head and severing each plant into two pieces.

7. An apparatus according to claim 5 wherein said row crop is a root crop, and additionally comprising a pair of plow means aligned with the rows being harvested and movably mounted on said vehicle between a lowered digging position below the roots being harvested and a transport position spaced above the ground.

8. An apparatus according to claim 7 wherein said plow means are moved between said two positions by hydraulic cylinders, and additionally comprising adjustable stop means for limiting the depth of cut to a selected depth, and means for locking each plow in a preselected one of a plurality of different positions transversely of the harvester for causing both of said plows to move transversely in response to steering the vehicle, said plow associated with said other head being wider than the plow associated with the head locked to said chassis for compensating for steering induced misalignment of said wide plow with said second row when the spacing between the rows varies.

9. A row crop harvester having a pair of picking heads for simultaneously harvesting two rows of plants of the type having flexible foliage incapable of transversely shifting the picking heads including a mobile vehicle having a chassis and support wheels, means for steering said vehicle, said pair of picking heads having forward and rear ends, means for mounting the rear end portion of each picking head on said chassis for pivotal movement about vertical and horizontal axes, skid means for supporting the forward end of each head on the ground for following the contour of the ground, means included in each picking head for gripping the plants in the associated row and for advancing the plants to a transfer point, severing means supported by said chassis for receiving the plants at said transfer point from each picking head and for thereafter severing each plant into two pieces, means on said vehicle for collecting one of the several pieces of each plant; the improvement which comprises means for selectively locking the forward end of one of said heads from transverse movement relative to said vehicle in a preselected position determined by the average spacing of the rows being harvested, said one head being maintained in alignment with its associated row by steering the vehicle, and operator controlled means for selectively laterally shifting the forward end of the other head transversely along a fixed path with respect to said one head during the harvesting operation to maintain said forward end of said other head in alignment with the associated row of plants even though the spacing between the rows varies.

10. A harvester for row crops comprising: a wheel supported frame including a pair of laterally spaced front wheels; means defining an operator's station adjacent the inside of one of said wheels; a pair of laterally spaced picking heads supported between said front wheels for simultaneously harvesting two rows of plants, said operator's station being located between said adjacent wheel and the nearest of said picking heads; means mounting the picking head which is remote from the operator's station on said frame for lateral shifting movement of its forward end along a fixed path toward and away from said nearest picking head; control means at said operator's station operatively connected to said remote picking head for enabling the operator to readily change the lateral position of its leading end relative to said frame and to said nearest picking head before and during the harvesting operation, means mounting said nearest picking head so as to be held from lateral movement relative to said frame, and means for steering the frame for maintaining said nearest head in alignment with a row of plants during the harvesting operation.

* * * * *